M. H. N. Kendig,
Paper Fastener.
No. 66,968.          Patented July 23, 1867.
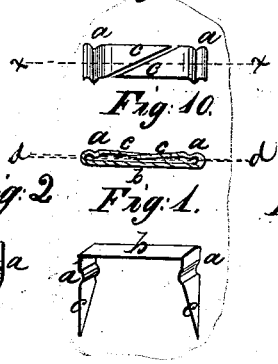
Witnesses:
George A. Nolen
Henry L. Munson
Inventor:
M. H. N. Kendig

United States Patent Office.

M. H. N. KENDIG, OF WASHINGTON, DISTRICT OF COLUMBIA.

Letters Patent No. 66,968, dated July 23, 1867.

---

PAPER-FASTENING.

---

The Schedule referred to in these Letters Patent and making part of the same.

---

Be it known that I, M. H. N. KENDIG, of the city and county of Washington, and District of Columbia, have invented certain new and useful improvements in Paper-Fastenings; and I do hereby declare that the following is a full, clear, and exact description thereof, which will enable others skilled in the art to make and use the same, reference being had to the accompanying drawing, in which—

Figure 1 is a perspective view.

Figures 2 and 3, end views.

Figure 4, a bottom view, showing the device when applied.

Figure 5, a perspective view of a modification.

Figures 6 and 7, end views of same.

Figures 8 and 9, bottom views of same.

Figure 10, sectional view through lines $x\ x\ x\ x$, showing position of the ends when attached.

Figure 11, top view of modification.

Figure 12, sectional view of same when attached.

Figure 13, perspective view of same.

Figure 14, top view of modification.

Figure 15, sectional view of same when attached.

Figure 16, sectional view of same when unattached.

Figure 17, a view of the several clasps, showing the mode of cutting out from the metal in sheet or strip.

My invention consists of a paper-fastener or clasp, cut or struck out of sheet metal, in the form shown in the drawings, its fastening ends being provided with a shoulder or bearing point for the purpose of allowing said ends to be bent down in contact with and preventing them from projecting or sticking up from the surface of the articles to which they are attached, as will be more fully hereinafter described.

In order to enable others skilled in the art to make and use my invention, I will proceed to describe the same.

From sheet metal, of suitable kind, by means of suitable well-known instruments for cutting and swaging metal, I cut out the clasp in the form shown in fig. 17, and then bend or swage it up in the form shown in figs. 1 and 5, and either before or after bending it to this form, or in the act of so doing, I depress a portion of its surface with a long recess or slot, $a$, or teat $a'$, at or near the point indicated by the said letters of reference in the drawings, the object of which will hereafter be fully explained. In order to give more bearing surface, and prevent the same from bending, I may form a projection from the top of the clasp by cutting a portion of it, as seen at $e$, figs. 11 and 13, where is shown a portion cut to form a lip, and turned outward for the purpose named; or, in lieu of this construction, I may bend the clasp in the form indicated in fig. 16, the metal being bent in such shape as to form a shoulder as of $f$.

It will be observed by a reference to the drawings, that the legs of this clasp are made sharp by cutting the metal at angles to its length, by which they are provided with sharpened ends, and the metal or material is utilized as is fully shown in fig. 17. This construction enables them to be forced through the paper without first cutting a hole. When the ends are once through the paper, it will be seen, by reference to figs. 10, 12, and 15, that the shoulder or bearing point formed by the depression $a$ or teats $a'$, will prevent that portion of the leg on which they are located from reaching the surface of the paper, except at the bearing point formed by these depressions, and will cause the outer end of the leg to be depressed to a point as much lower than the surface of the clasp, or its heel or point, where it comes through the paper, as the depression or teat $a\ a'$ is deep, and hence, as it is obvious, will prevent the sharpened end of the leg from sticking up. It will be evident that one or more of the teats $a'$ will accomplish the same effect as the long depression $a$.

Paper-fasteners as at present made are objectionable for many reasons. Some have but one point of bearing, like that patented to McGill, which acts, when attached to the paper, as a fulcrum, upon which the leaves readily rotate, and soon, by tearing away round the said point, become detached and separated. All are fastened by lips or legs turned in both directions on their under side, and invariably stick up, as their ends have no bearing point save that formed by the hole in the paper through which they pass. This latter feature of them all has caused many to discard them, and fall back to the eyelet as the only unobjectionable fastening in this respect.

In my improved device this objection is removed, and as is readily apparent unless distorted in form it cannot by any possibility present its legs upturned. And moreover the first objection is removed by its being provided with separate legs, forming two distinct holding points.

What I claim, is—

A paper-fastener, provided with a slot, $a$, or teats $a'$, in its legs or clasping points, substantially as and for the purpose set forth.

M. H. N. KENDIG.

Witnesses:
H. F. MUNSON,
GEORGE A. NOLEN.